(12) United States Patent
Braun

(10) Patent No.: US 7,387,127 B1
(45) Date of Patent: Jun. 17, 2008

(54) CIGAR HOLDER FOR GOLF CART

(76) Inventor: Jon Leonard Braun, 4521 Sunbeam Rd, Jacksonville, FL (US) 32257

( * ) Notice: Subject to any disclaimer, the term of this patent is extended or adjusted under 35 U.S.C. 154(b) by 458 days.

(21) Appl. No.: 11/084,611

(22) Filed: Mar. 19, 2005

Related U.S. Application Data

(60) Provisional application No. 60/521,241, filed on Mar. 18, 2004.

(51) Int. Cl.
*A24F 9/14* (2006.01)
*A24F 13/22* (2006.01)
*A24F 19/00* (2006.01)

(52) U.S. Cl. ............ 131/257; 131/256; D27/109; D27/126; 206/246; 220/253

(58) Field of Classification Search ............ 131/240.1, 131/231, 257, 259
See application file for complete search history.

(56) References Cited

U.S. PATENT DOCUMENTS

| 743,253 A | 11/1903 | Crapp | |
|---|---|---|---|
| D86,716 S * | 4/1932 | Haber | D27/135 |
| 1,876,299 A * | 9/1932 | Honigbaum | 131/174 |
| 2,536,725 A * | 1/1951 | Cleveland | 211/86.01 |
| 2,931,365 A | 4/1960 | McKenzie | |
| 2,950,836 A | 8/1960 | Murdock | |
| 3,017,890 A * | 1/1962 | Nelson | 131/259 |
| 4,281,672 A | 8/1981 | Caraway | |
| 4,915,337 A * | 4/1990 | Iwasaki | 248/311.2 |
| 5,524,646 A | 6/1996 | Reich | |
| 5,706,832 A | 1/1998 | Gold | |
| 6,530,510 B2 | 3/2003 | Ferrari | |

\* cited by examiner

*Primary Examiner*—Steven P. Griffin
*Assistant Examiner*—Phu H Nguyen
(74) *Attorney, Agent, or Firm*—Jonathan R Smith

(57) ABSTRACT

A cigar holder assembly is provided for golf carts utilizing biased clasps to hold one or more cigars in a vertical position over a removable ashtray. Temporary and permanent means for attaching the cigar holder to a golf cart are provided, and a swivel mount is provided between the attachment and the cigar holder to allow the cigar holder to maintain a substantially vertical orientation.

3 Claims, 11 Drawing Sheets

Section A-A' of Fig. 7

CIGAR HOLDER FOR GOLF CART

This nonprovisional application for utility patent claims priority of provisional patent application Ser. No. 60/521,241 filed Mar. 18, 2004.

SUMMARY OF INVENTION

Golfers who smoke while playing golf prefer to put lit smoking materials in a secure and convenient place while they make golf shots. Various ashtrays exist in the prior art that can be carried in or attached to a golf cart. The existing art has certain drawbacks, including poor containment of ashes, inconvenient ash disposal, and insecure holding of smoking materials during motion of the cart, especially when the cart is on an incline.

This invention provides a smoking material holder, shown here as applied to holding of cigars, but applicable in principle to cigarettes and cigarillos. While intended for use on golf carts, it is applicable to use on other vehicles, such as boats, and stationary structures such as decks and cabanas. In this disclosure, for convenience, the smoking materials will be referred to as cigars and the supporting structure will be referred to as a golf cart, without restricting the applicability of the invention to other smoking materials and structures.

The holder comprises a mounting part, which clamps onto any thin edge of a golf cart, and a hanging part, which holds cigars and an ashtray. The hanging part freely depends from the mounting part to maintain substantial vertical orientation no matter the inclination of the golf cart and the mounting part.

The hanging part further comprises one or more vertical cigar clasps arranged to hold one or more cigars in a vertical orientation with the lit end facing downward. Below the lit cigar end(s) is a removable ashtray.

Additional embodiments of the invention include two additional means for attaching the invention to the golf cart, and two different types of mountings utilizing preexisting cup holders on a golf cart.

A principal object of this invention is to provide an apparatus for mounting in or on a vehicle to temporarily hold one or more smoking materials so that the smoking materials stay lit and out of contact with soiled or heat-sensitive surfaces. Another object of the invention is to hold the smoking materials in a substantially vertical orientation regardless of the incline of the vehicle. Yet another object of the invention is to provide as part of the apparatus an easily removable receptacle for ashes. A further object of the invention is to make the apparatus easily moved from one vehicle to another, and make it capable of being installed in a variety of positions and locations in and on the vehicle.

DETAILED DESCRIPTION

Figure 1:
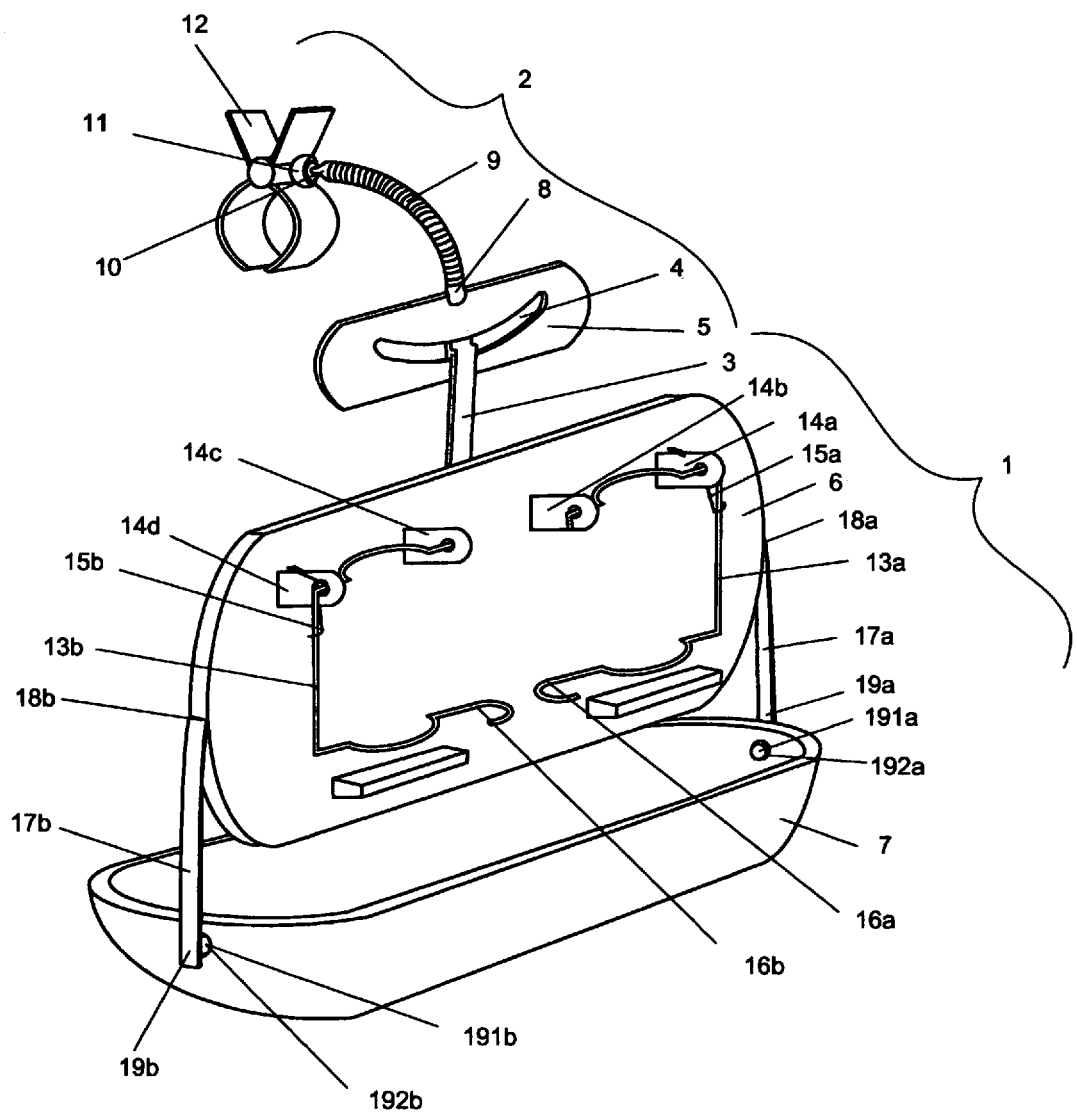
FIG. 1 is a perspective view of the preferred embodiment of the invention.

Referring now to the drawings, in which like reference numerals represent like features among the drawings, FIG. 1 is a perspective view of the preferred embodiment of the invention. The invention has two principal parts: a hanging part 1 and a mounting part 2. Hanging part 1 is shown depending from mounting part 2 by a hanger bar 3, which hangs from slot 4 cut in a swivel plate 5. Hanging part 1 includes a vertical panel 6, below which hangs an ashtray 7. Panel 6 is fixedly connected to hanger bar 3, although for convenience of assembly of the device from shipped parts, hanger bar 3 may be made detachable from panel 6). The mounting part 2 includes the above-mentioned swivel plate 5, which is fixedly attached to proximal end 8 of gooseneck 9. (A "gooseneck" is a common form of elongate repositionable material consisting of intussuscepting helically-wound metal bands typically used in lamps to permit the lamp to be positioned temporarily in any one of many possible positions above the lamp base. Use of the term here is meant to be descriptive of any elongate repositionable member that may be flexed and set in a variety of temporary positions and is not meant to restrict the scope of this invention to intussuscepting helically-wound metal.) (For convenience of assembly of the device from shipped parts, gooseneck 9 may alternatively be made detachable from swivel plate 5.) Distal end 10 of gooseneck 9 is equipped with a ball-and-socket joint 11, which in turn is fixedly connected to a spring clamp 12. Spring clamp 12 may be clamped to any surface narrow enough to accept it. Gooseneck 9 may be rigid or flexible; if flexible, it may more readily be bent in whatever direction is necessary to place swivel plate 5 substantially in the orientation shown.

Panel 6 on hanging part 1 has cigar clasps 13a and 13b rotatably attached to the front of panel 6 by bearing arms 14a-d. Each clasp is formed from a single piece of rigid material into a substantially rectangular shape, with its upper part held by the two bearing arms and the lower part swingable under finger pressure. Cigar clasps 13a and 13b are biased by springs 15a and 15b, respectively, so as to cause finger-pulls 16a and 16b, respectively, to press against the front of panel 6.

Ashtray 7 is pivotably and removably suspended from panel 6 by means of leaf springs 17a and 17b. The leaf springs are fixedly attached to the sides of panel 6 at their upper ends 18a and 18b, respectively. The lower ends 19a and 19b, respectively, of springs 17a and 17b, are equipped with cylindrical axles 191a and 191b, respectively, which mate with holes 192a and 192b, respectively, in ashtray 7. Springs 17a and 17b are biased towards the center of ashtray 7, thereby maintaining axles 191a and 191b in holes 192a and 192b. The ashtray 7 may be removed from the rest of the assembly by pulling either of the springs 17a or 17b outward to free axle 191a or 191b from hole 192a or 192b, respectively. The springs described here are leaf springs, but any elongate spring capable of deformation under finger pressure may be used, without limitation. The use of cylindrical axles to support the ashtray permits it to remain substantially level when the golf cart is on an inclined surface.

Figure 2:
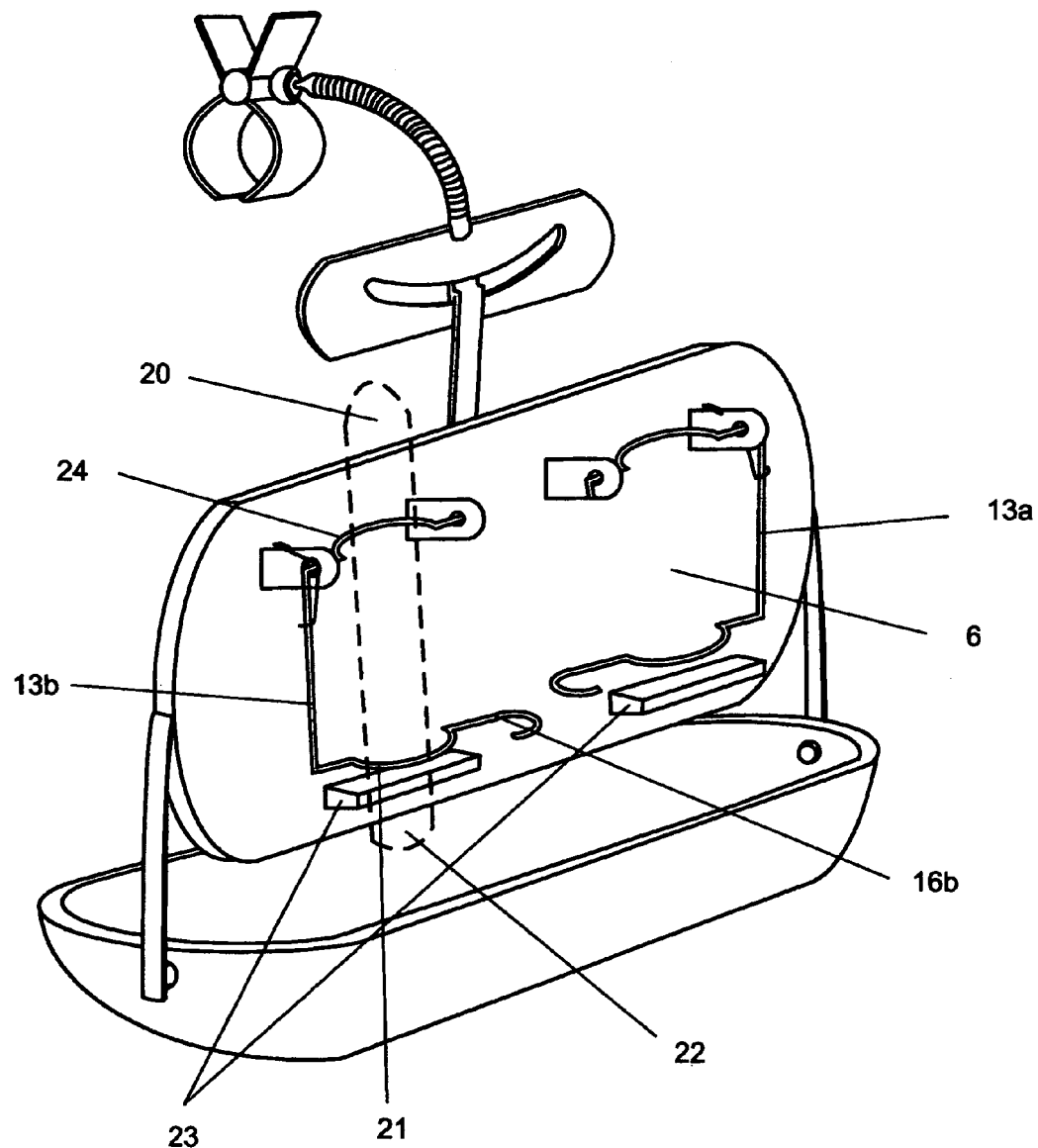
FIG. 2 is a perspective view of the preferred embodiment with a cigar in place.

FIG. 2 is a perspective view of the preferred-embodiment with the environmental object of a cigar in place. A cigar 20 is put into the left side of the invention by pulling lever 16*b* forwardly away from panel 6 and placing the cigar 20 behind lower collar 21 of left cigar clasp 13*b*. The lit end 22 of the cigar 20 is placed low enough so that an unburned part of the cigar will come into contact with boss 23 when lever 16*b* is released. Boss 23 is a horizontal bar provided to hold the lit end 22 of the cigar 20 away from panel 6 so that the hottest part of the cigar will normally not bear on the material of panel 6. This protects panel 6 and prevents possible combustion products from the material of panel 6 from entering the cigar. When lever 16*b* is released, lower collar 21 presses against the cigar, which is in turn pressed against boss 23 and upper collar 24. The cigar is removed again by pulling lever 16*b* outward.

The cigar clasps 13*a* and 13*b* are preferably made of, or coated with, slip-resistant material such as neoprene, and all parts of the invention should be made of burn-resistant materials such as metal or ceramic.

Figure 3:
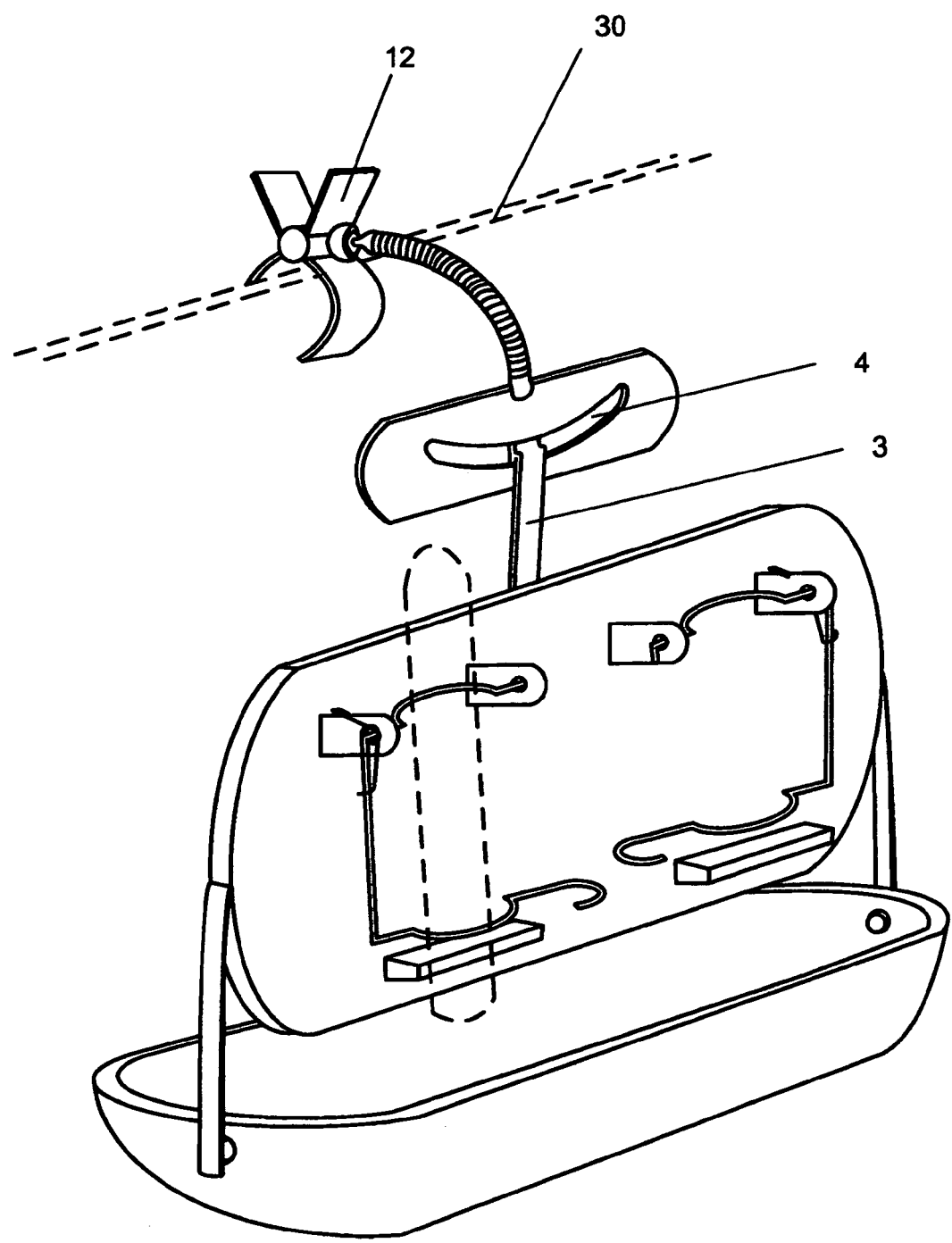
FIG. 3 is a perspective view of the preferred embodiment clipped to a horizontal support.

The golf cart environmental structure typically contains various panels with edges to choose from for mounting the invention. As shown in FIG. 3, spring clamp 12 is clamped to an environmental horizontal support 30. Note that hanger bar 3 is roughly centered in slot 4.

Figure 4:
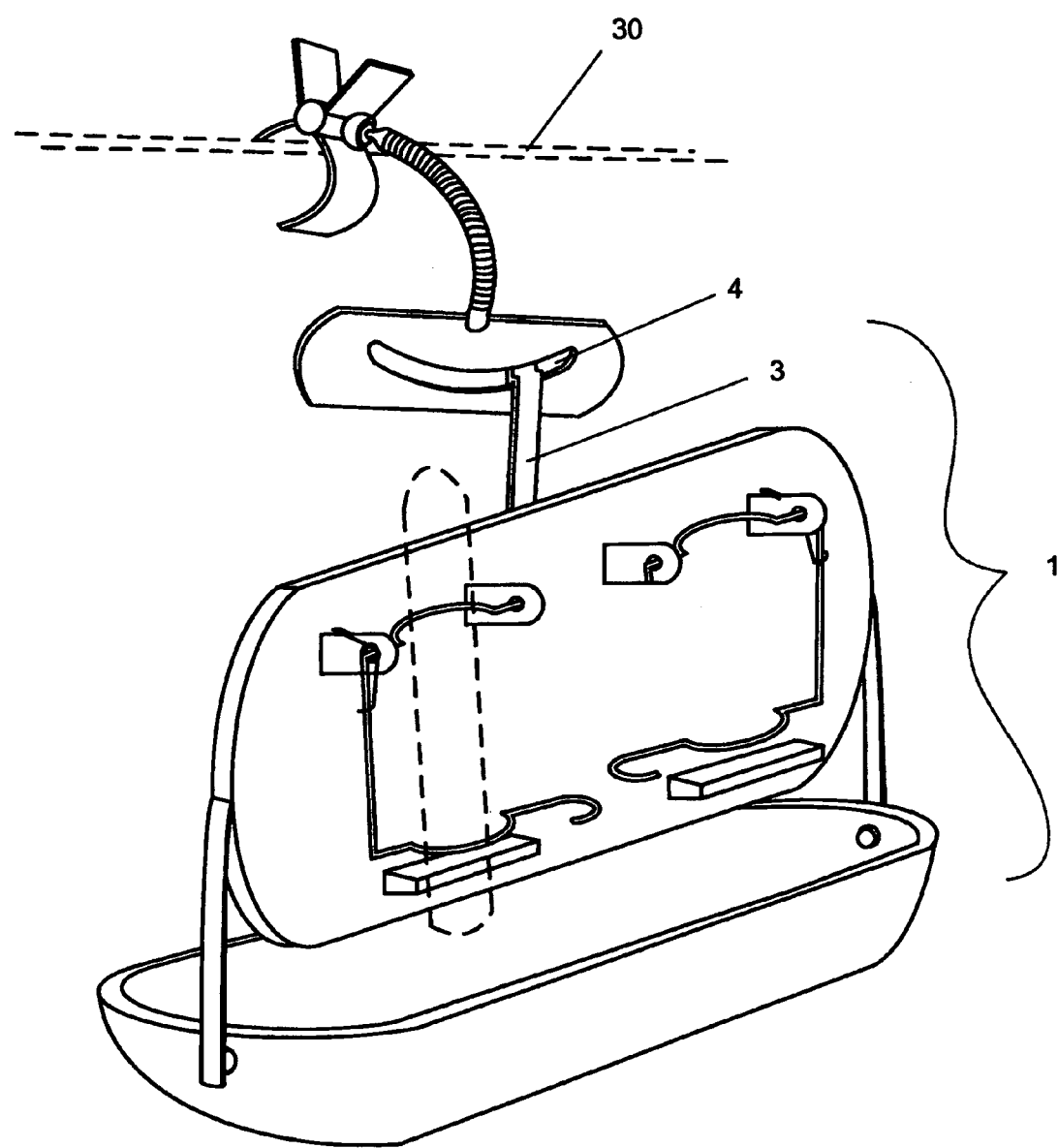
FIG. 4 is a perspective view of the preferred embodiment with the horizontal support of FIG. 3 tilted.

In FIG. 4, the golf cart has been moved to a surface which slopes downward to the right. This causes support 30, shown roughly level in FIG. 3, to tilt a like amount to the right in FIG. 4. Hanger bar 3 is slidingly mounted in slot 4, so that the weight of the hanging part 1 causes hanger bar 3 to slide to the right, thereby maintaining the hanging part in a substantially level orientation.

Figure 5:
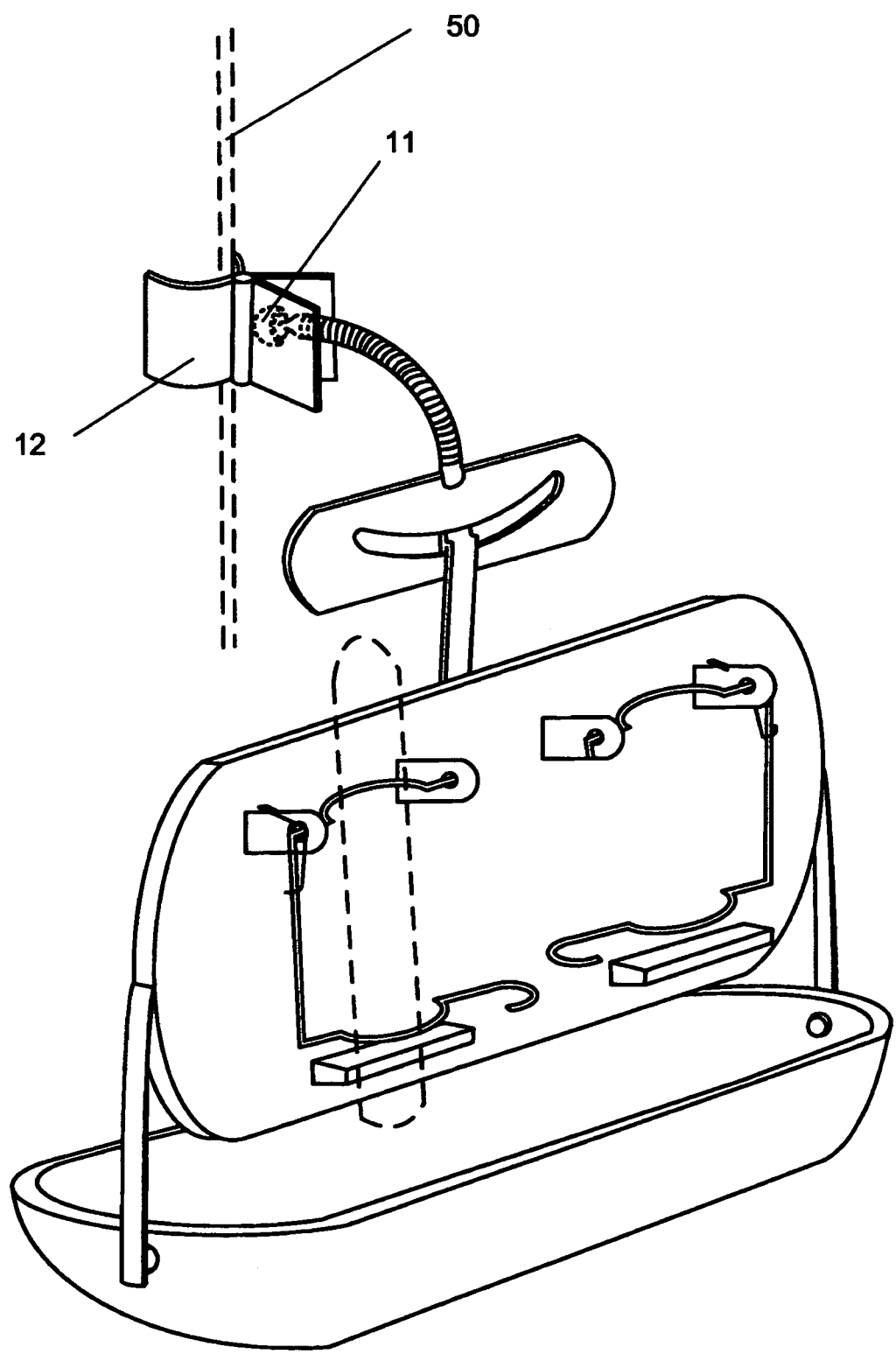
FIG. 5 is a perspective view of the preferred embodiment clipped to a vertical support.

The preferred embodiment of the invention may be clipped to a vertical support edge as shown in FIG. 5. Here, spring clamp 12 has been rotated about the ball-and-socket joint 11 to enable it to grip vertical edge 50.

Figure 6:
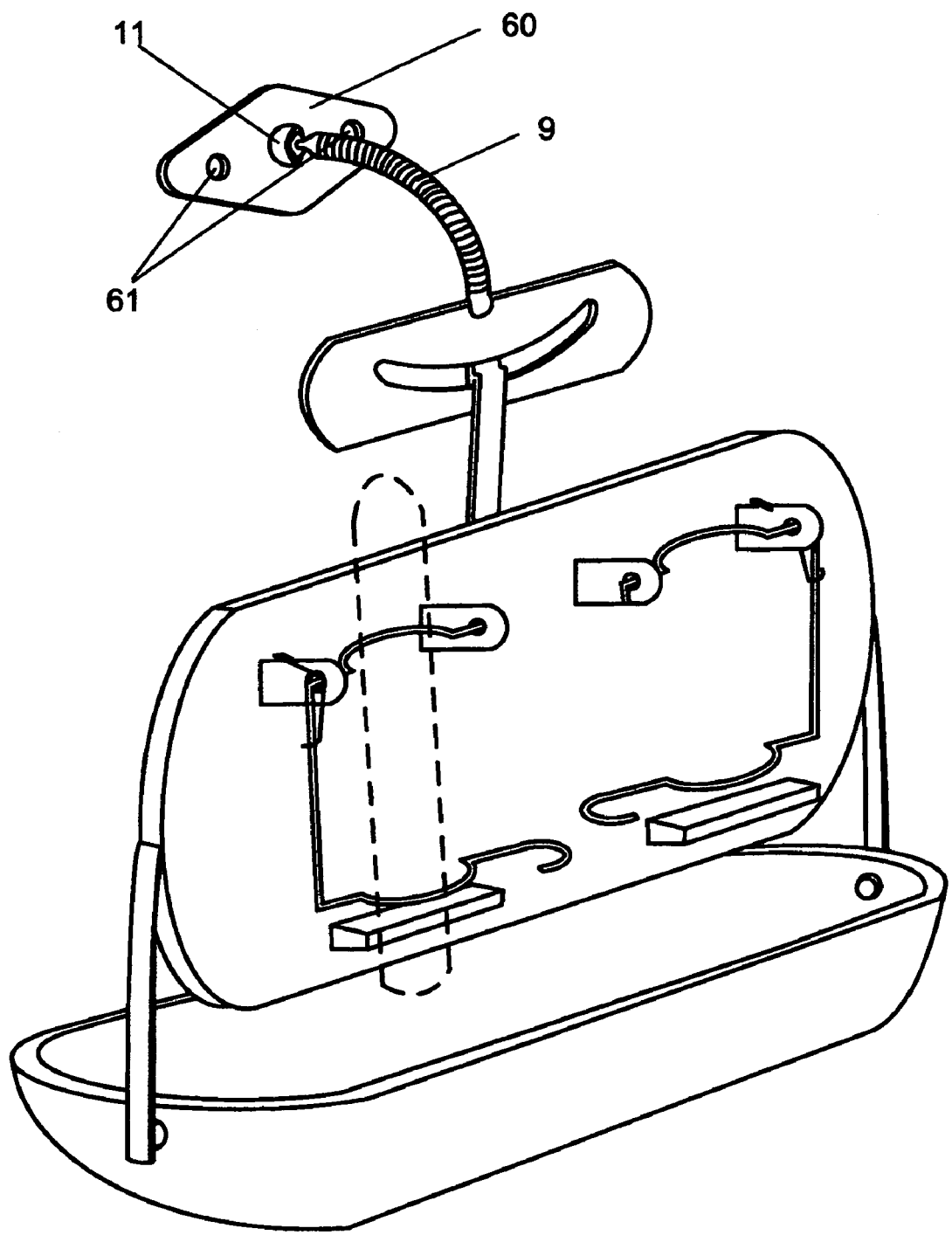
FIG. 6 is a perspective view of a second embodiment of the invention.

FIG. 6 is a perspective view of a second embodiment of the invention. In this embodiment, the spring clamp 12 of FIG. 1 has been replaced by a bracket 60, fixedly attached to ball-and-socket 11. (For convenience of assembly of the device from shipped parts, the ball-and-socket 11 may be detachable from bracket 60, or, alternatively, from the gooseneck 9. Another alternative for assembly of parts is to provide a ball-and-socket of the type which permits the socket to be released from the ball.) Holes 61 permit bracket 60 to be bolted or screwed to any free surface on the golf cart using common fasteners.

Figure 7:
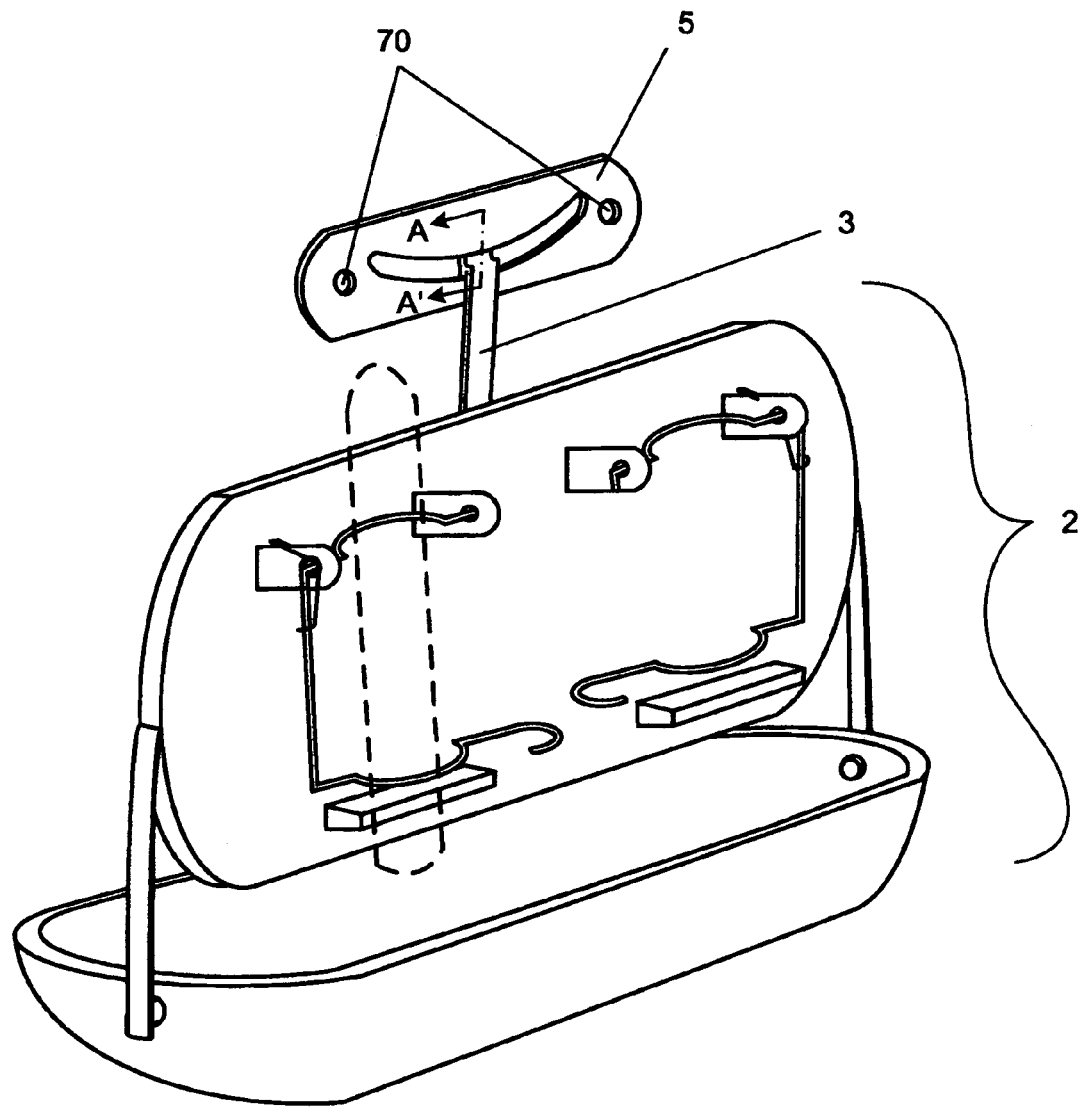
FIG. 7 is a perspective view of a third embodiment.

FIG. 7 is a perspective view of a third embodiment of the invention in which swivel plate 5 is the only mounting part. This embodiment might be preferred if a flat mounting surface exists on a golf cart having sufficient room underneath it to accommodate hanging part 2 without interference with other objects. Bolt holes 70 are provided in swivel plate 5 for this purpose.

Figure 8:
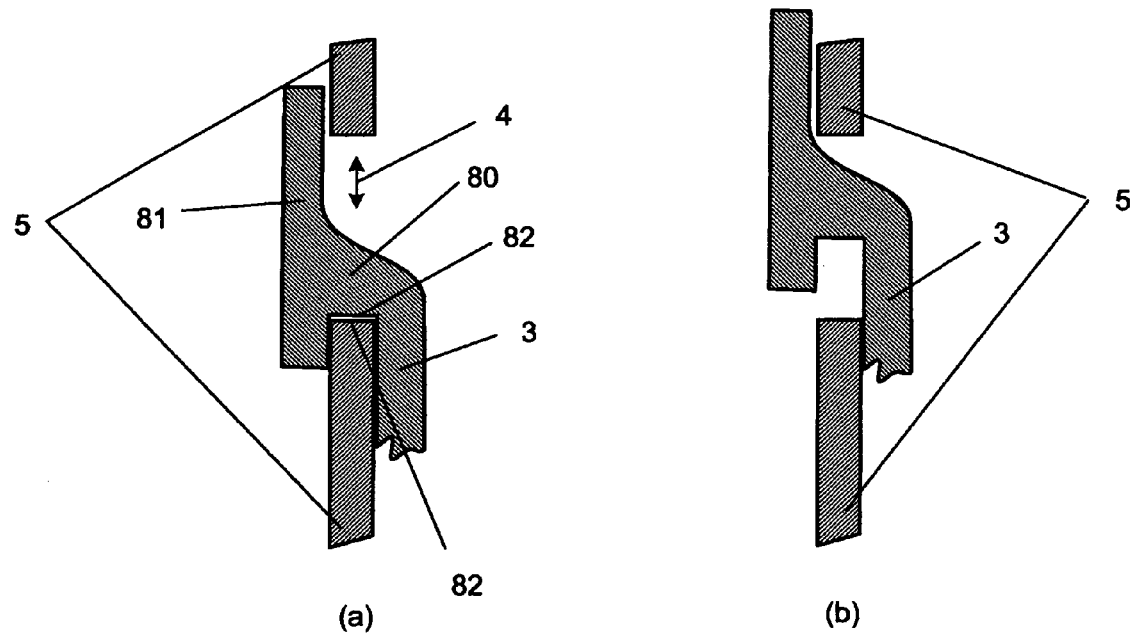
FIG. 8 is a perspective view of a fourth embodiment.
Figure 8:
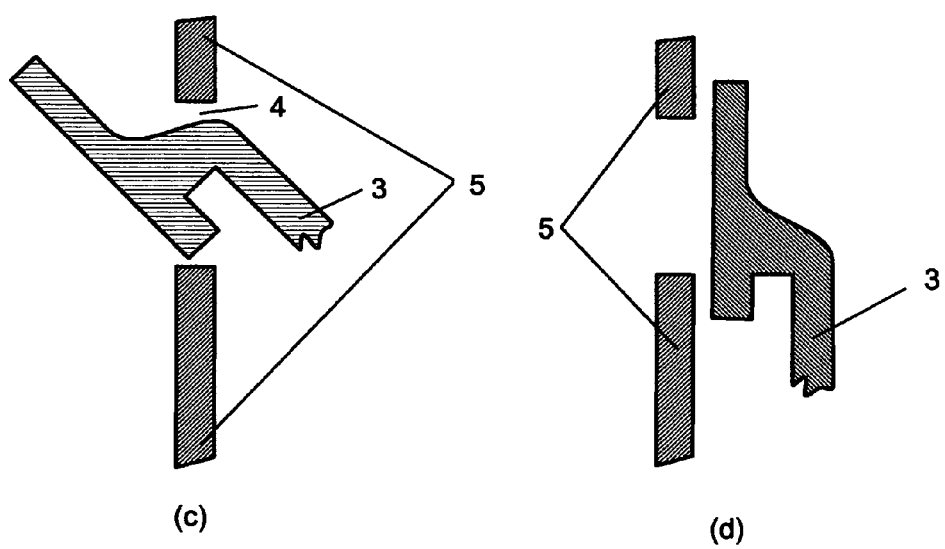

Note also in FIG. 7 section reference line A-A', referring to the views in FIG. 8 to show more clearly the sliding connection between hanger bar 3 and swivel plate 5.

FIG. 8(*a*) is section view A-A' from FIG. 7. Hanger bar 3, shown in cross-section, has an upper end 80 further consisting of a vertical back plate 81 and an undercut 82. The lower edge 83 of slot 4 in swivel plate 5 fits loosely in undercut 82, allowing hanger bar 3 to slide along it (in and out of the page in this view). Note that back plate 81 is of greater vertical height than slot 4, preventing the hanger bar 3 from falling out of the slot 4 merely as a result of a bumpy ride. Hanger bar 3 may be intentionally disengaged from swivel plate 5 by lifting up the hanger bar relative to the swivel plate, as shown in FIG. 8(*b*); tilting the hanger bar 3 backward within the slot 4, as shown in FIG. 8(*c*); and pulling the hanger bar 3 forward (to the right in these views) clear of the swivel plate 5, as shown in FIG. 8(*d*).

Figure 9:
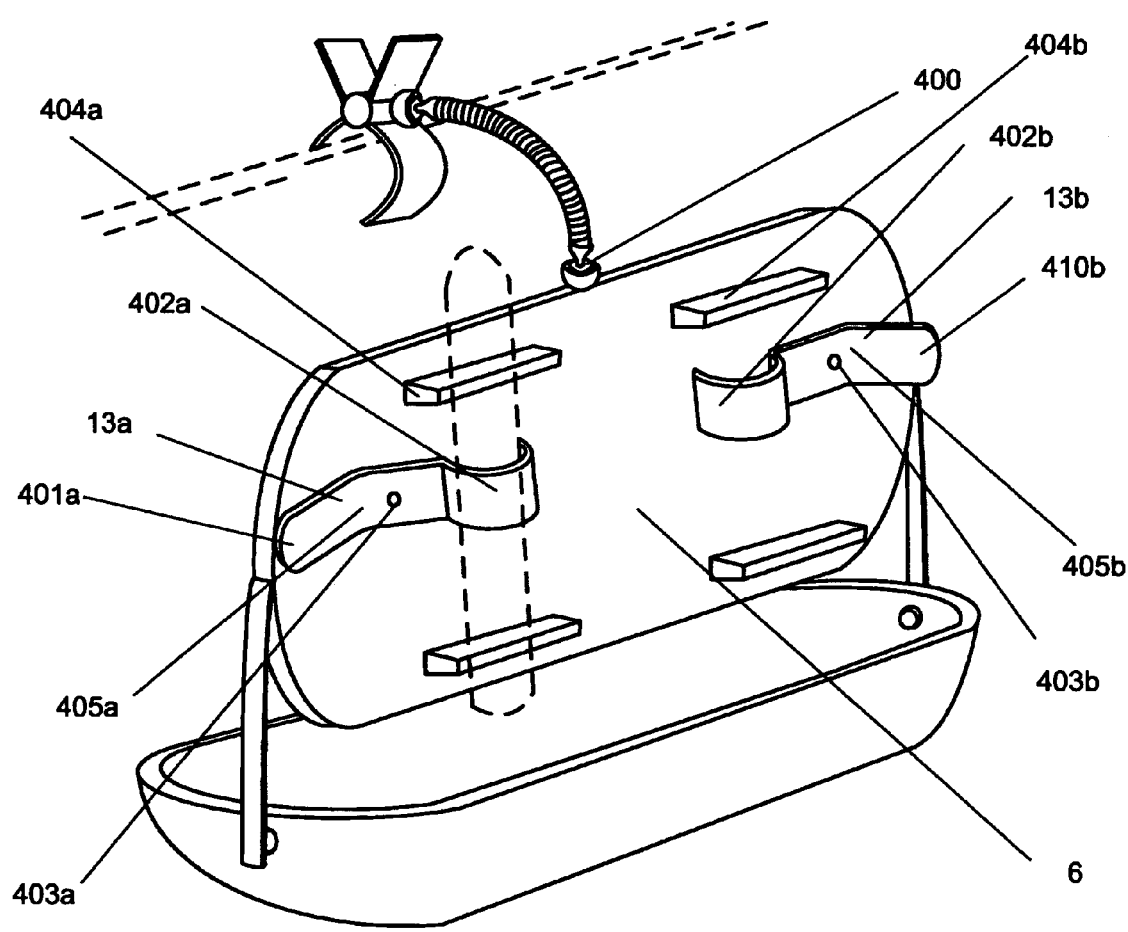
FIG. 9 is a cross-sectional view of the swivel connection.

FIG. 9 is a perspective view of a fourth embodiment of the invention, in which a second ball and swivel 400 replaces the hanger bar and swivel plate arrangement of the first three embodiments. Cigar clasps 13*a* and 13*b* here take the form of angled levers having finger tabs 401*a* and 401*b* at one end and arcuate cigar tabs 402*a* and 402*b* at the other. Springs 403*a* and 403*b* are mounted near the vertices of angles 405*a* and 405*b* in the clasps 13*a* and 13*b*. The angles 405*a* and 405*b* provide fulcrums for the levers. If the springs are mounted between the angles 405*a* and 405*b* and the cigar tabs 402*a* and 402*b* as shown here to bias the cigar tabs 402*a* and 402*b* toward the panel 6, they will secure the smoking material in place.

Also shown in FIG. 9 are optional upper bosses 404*a* and 404*b*, which are horizontal bars attached to panel 6 for a similar purpose as bosses 23 in FIG. 2. These optional bosses hold the unlit end of the cigar away from, and out of contact with, panel 6 for sanitary reasons.

Figure 10:
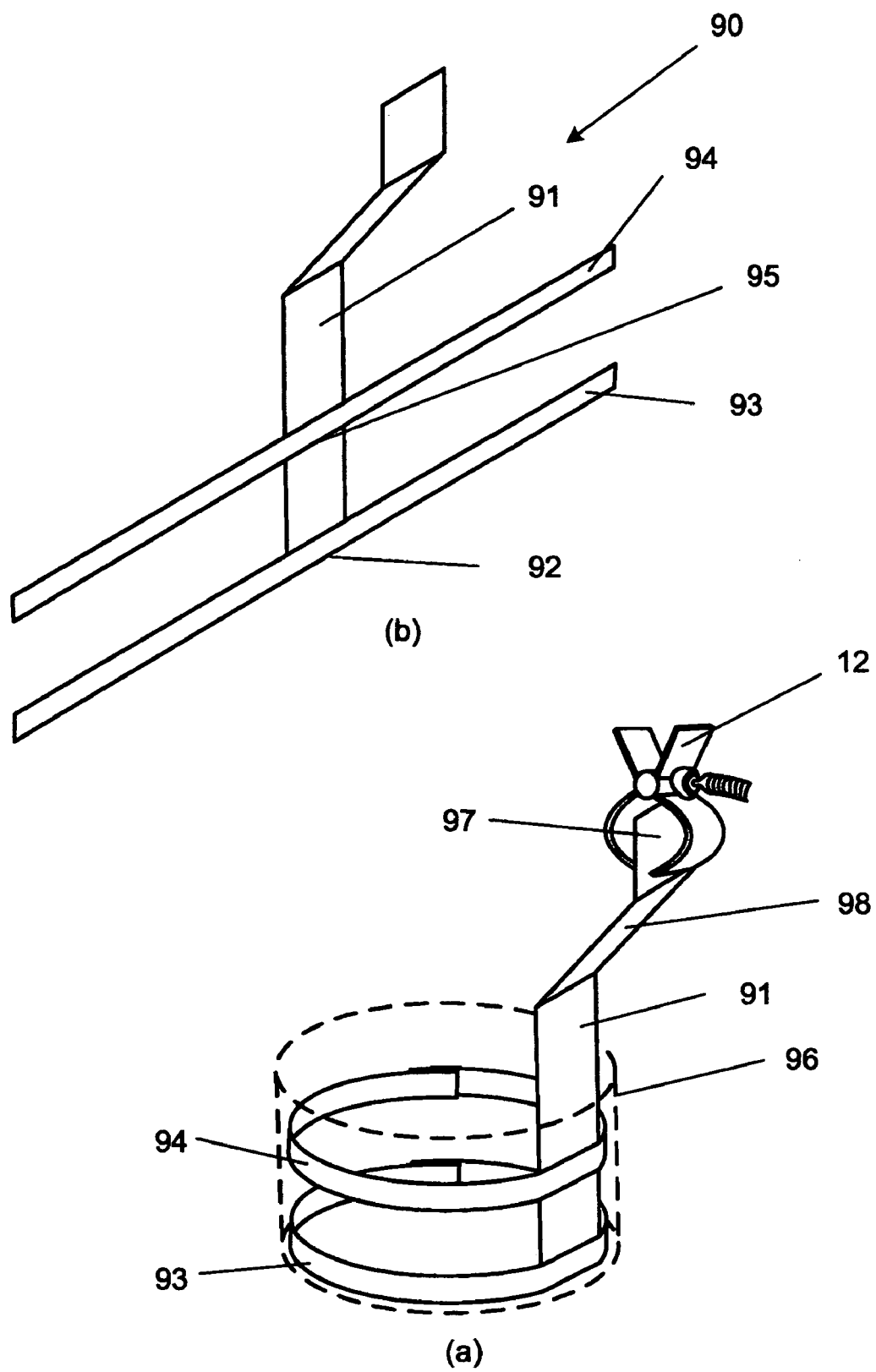
FIG. 10 is a perspective view of a fifth embodiment of the invention.

FIG. 10 is a perspective view of a fifth embodiment of the invention, in which support for the cigar holder is provided by an additional adapter 90 shaped to fit inside a preexisting cup holder. As shown in FIG. 9(*a*), the adapter 90 is a rigid, shaped bracket 91, having fixedly and perpendicularly attached to it at its bottom edge 92, a first flexible elongate strip 93. Above this first strip 93 is a parallel second flexible elongate strip 94, also fixedly attached to bracket 91 at intermediate height 95. The adapter may be placed temporarily in an environmental cup holder 96 by bending strips 93 and 94 around onto themselves while inserting them into the cup holder 96. Spring clamp 12 of the first embodiment may then be applied to top end 97 of bracket 91. An offset bend 98 may be provided in bracket 91 to better allow continued placement of cups in the cup holder.

Figure 11:
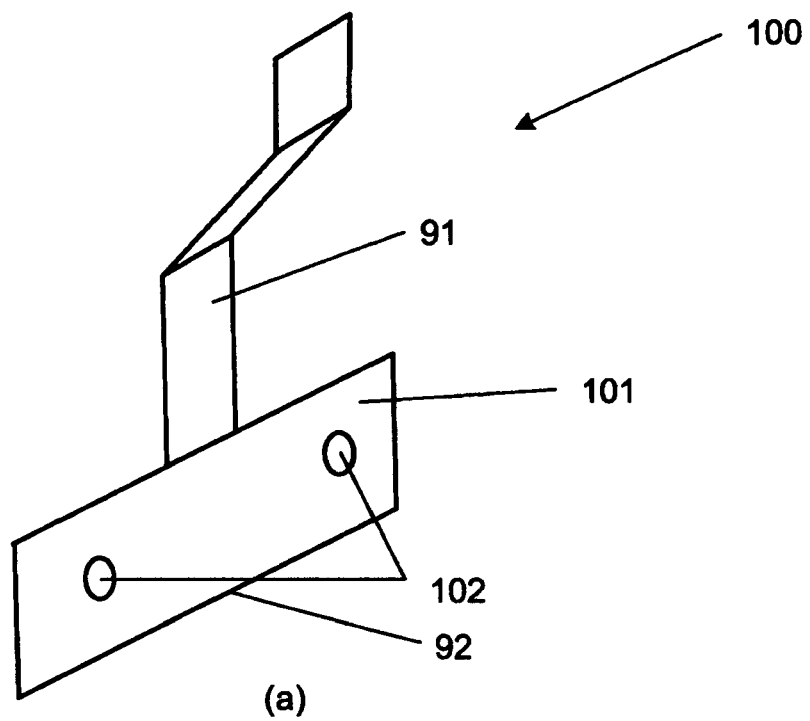
FIG. 11 is a perspective view of a sixth embodiment of the invention.
Figure 11:
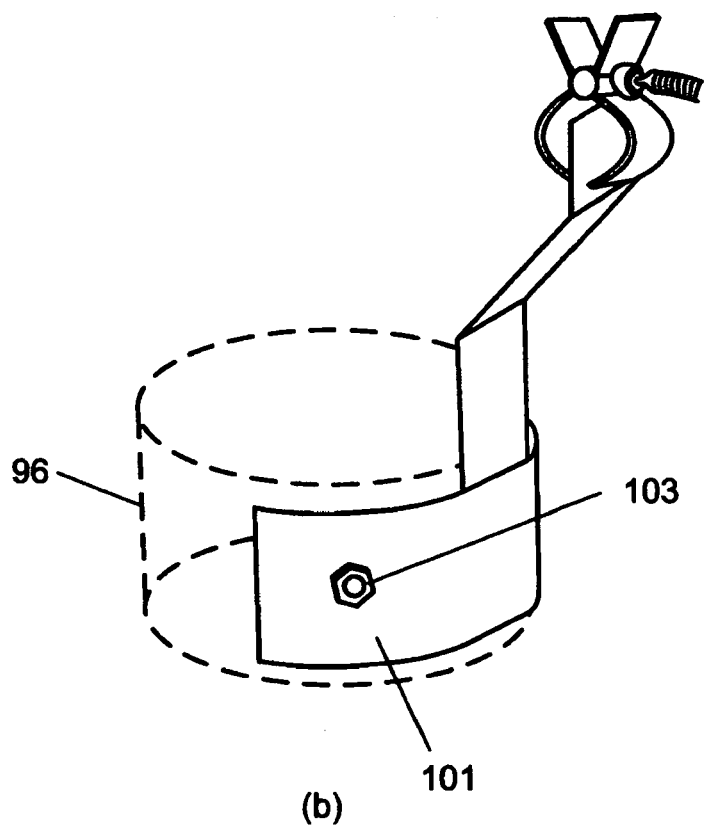

FIG. 11 is a perspective view of a sixth embodiment of the invention, in which a different adapter 100, made for permanent attachment to the outside surface of a cup holder 96, is provided. As shown in FIG. 10(*a*), a bendable brace 101 is fixed to the bottom end 92 of bracket 91, with bolt holes 102 provided to permit the adapter to be permanently affixed to cup holder 96. FIG. 10(*b*) shows this adapter attached to the outer surface of the cup holder 96 with fasteners 103.

What is claimed is:

1. A portable apparatus for holding smoking materials in a vehicle, comprising:
   a substantially vertical panel having an upper edge, a right edge, a left edge, and a lower edge, and a clasp biased against the vertical panel for releasably holding lit smoking materials;
   a substantially horizontal ash tray, the ash tray having a right end and a left end, and the ash tray being releasably attached to the lower edge by a tray attachment means;
   a securing means attached to the panel, for removably securing the apparatus to a vehicle;
   the securing means comprising either
   an elongate repositionable member having an end proximate to the panel and attached to the panel by a pivot means, and an end distal to the panel having attached thereto a finger clamp, or
   an elongate repositionable member having an end proximate to the panel and attached to the panel by a pivot means, and an end distal to the panel having attached thereto a ball and socket, the ball and socket in turn attached to a finger clamp, or an elongate repositionable member having an end proximate to the panel and attached to the panel by a pivot means, and an end distal to the panel having attached thereto a ball and socket, the ball and socket in turn attached to a bracket which may be fixed temporarily to the vehicle by fasteners;

the securing means allowing the panel to pivot freely about the securing means in any direction:

the pivot means comprising either a ball and socket, or a hanger consisting of a rigid hanger bar having a straight end and a hooked end, the hooked end fixed to the panel in a substantially perpendicular orientation to the upper edge, and a swivel plate fixed to the repositionable member, the swivel plate having a slot cut therethrough substantially parallel to the upper edge, the hooked end being slidably inserted into the slot;

the tray attachment means allowing the ash tray to pivot freely beneath the lower edge about an axis substantially parallel to the lower edge, and further comprising opposing elongate springs attached to, and dependent from, the right and left edges of the vertical panel, each elongate spring having an upper end attached to the vertical panel and a free lower end;

the lower ends of each elongate spring having fixed thereto a first bearing part;

the right and left ends of the ash tray each having fixed thereto a second bearing part; and the first bearing parts and the second bearing parts being releasably engaged to each other at the right and left ends of the ash tray;

the first bearing parts and the second bearing parts, when engaged, cooperate so as to allow the ash tray to rotate about an axis through the right and left ends;

the clasp biased against the vertical panel being shaped so that a smoking material may be clasped in a substantially vertical orientation against the vertical panel by the clasp biased against the vertical panel;

a first spacing means to keep the lit end of the smoking material above the ash tray and out of contact with surfaces, comprising a substantially horizontal bar fixed to the vertical panel near the lower edge, the bar being indented so as to conform to the external surface of a substantially cylindrical smoking material;

a second spacing means to keep the unlit end of the smoking material out of contact with surfaces, comprising a substantially horizontal bar fixed to the vertical panel near the upper edge, the bar being indented so as to conform to the external surface of a substantially cylindrical smoking material;

the clasp biased against the vertical panel comprising a pair of brackets fixed to the vertical panel and horizontally spaced apart, the first bracket having a first hole, the second bracket a second hole, the holes bored through the brackets along a common horizontal axis;

a thin, rigid, elongate rod having a first end and a second end, the rod being shaped so that the first end is mounted rotatably within the first hole, the rod being further shaped to pass horizontally behind a smoking material, through the second hole, downwardly alongside the smoking material, horizontally in front of the smoking material, and diagonally downwardly and away from the smoking material so that the second end forms a curved finger-pull; and a spring interposed between the first bracket and the rod so as to bias the rod rotationally within the first hole so that the second end is forced toward the vertical panel.

2. The apparatus of claim 1 in which:

said clasp biased against the vertical panel comprises an elongate rigid lever comprised of a short end and a long end, the short end comprising a finger tab, the long end comprising an arcuate smoking material tab, the axis of the short end and the axis of the long end being joined at an angle, the angle forming a fulcrum for the lever;

the fulcrum being rotatably attached to said vertical panel so that when the finger tab is held against said vertical panel, the smoking material tab is away from said vertical panel; and a biasing means provided at the fulcrum to urge the smoking material tab towards said vertical panel.

3. The apparatus of claim 2 in which:

said lever is oriented substantially horizontally on said vertical panel;

said fulcrum rotates about a substantially vertical axis; and said finger tab is proximate to either a) said right side, or b) said left side, so that when said finger tab is pinched against said vertical panel by human finger pressure, said smoking material tab is raised.

* * * * *